United States Patent [19]
Lueck et al.

[11] 3,800,162
[45] Mar. 26, 1974

[54] FILAMENT TENSION DETECTOR

[75] Inventors: Arthur M. Lueck, East Setauket; Edward A. Youch, Stony Brook, both of N.Y.

[73] Assignee: Quantum Sensing Incorporated, Bohemia, N.Y.

[22] Filed: Nov. 6, 1972

[21] Appl. No.: 303,858

[52] U.S. Cl. ............... 250/219 S, 356/238, 28/51, 250/231 R
[51] Int. Cl. .................................... G01d 5/34
[58] Field of Search............ 250/219 S, 231 R, 229; 28/51; 356/159, 160, 238

[56] References Cited
UNITED STATES PATENTS

| | | | |
|---|---|---|---|
| 2,389,625 | 11/1945 | Lambach et al. | 28/51 |
| 3,193,689 | 7/1965 | Kern | 250/219 S |
| 3,514,615 | 5/1970 | Noiles et al. | 356/159 X |
| 2,812,685 | 11/1957 | Vossberg | 250/219 S X |

Primary Examiner—Walter Stolwein

[57] ABSTRACT

Apparatus for monitoring tension in filamentary materials capable of exerting a control function when the tension falls outside of predetermined limits. The detector comprises a centrally pivoted arm having at one end a rider over which the filament passes, and at the opposed end a flag of predetermined size and mass. The detector has an unbalanced mass sufficient to deflect the filament a specified number of degrees under proper conditions of tension; an increase in filament tension raises the flag and a decrease in tension lowers the flag. In either event one of two light beams is broken, causing a light sensor to energize the desired control function. The invention also functions as a continuity or broken-filament detector, inasmuch as this is the equivalent of zero tension. In an alternative embodiment, the light beams may be replaced with electrical conductors and movement of the pivot arm utilized to close an electrical circuit and energize the desired control function.

13 Claims, 5 Drawing Figures

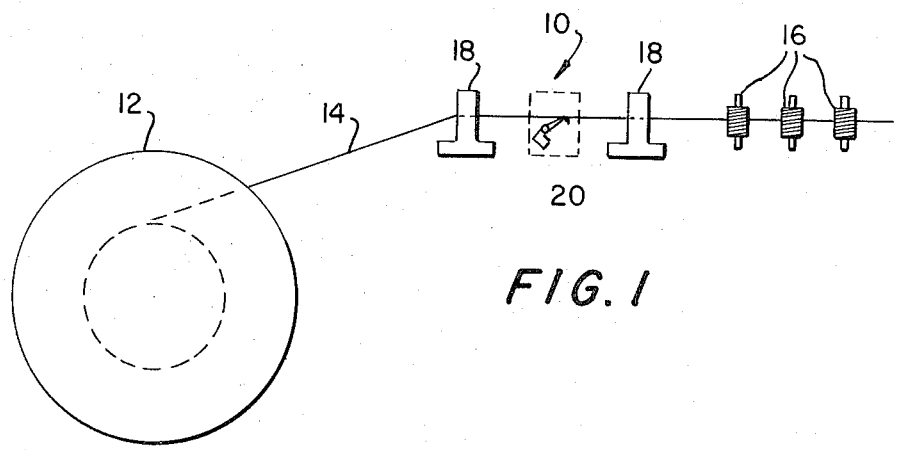
FIG. 1
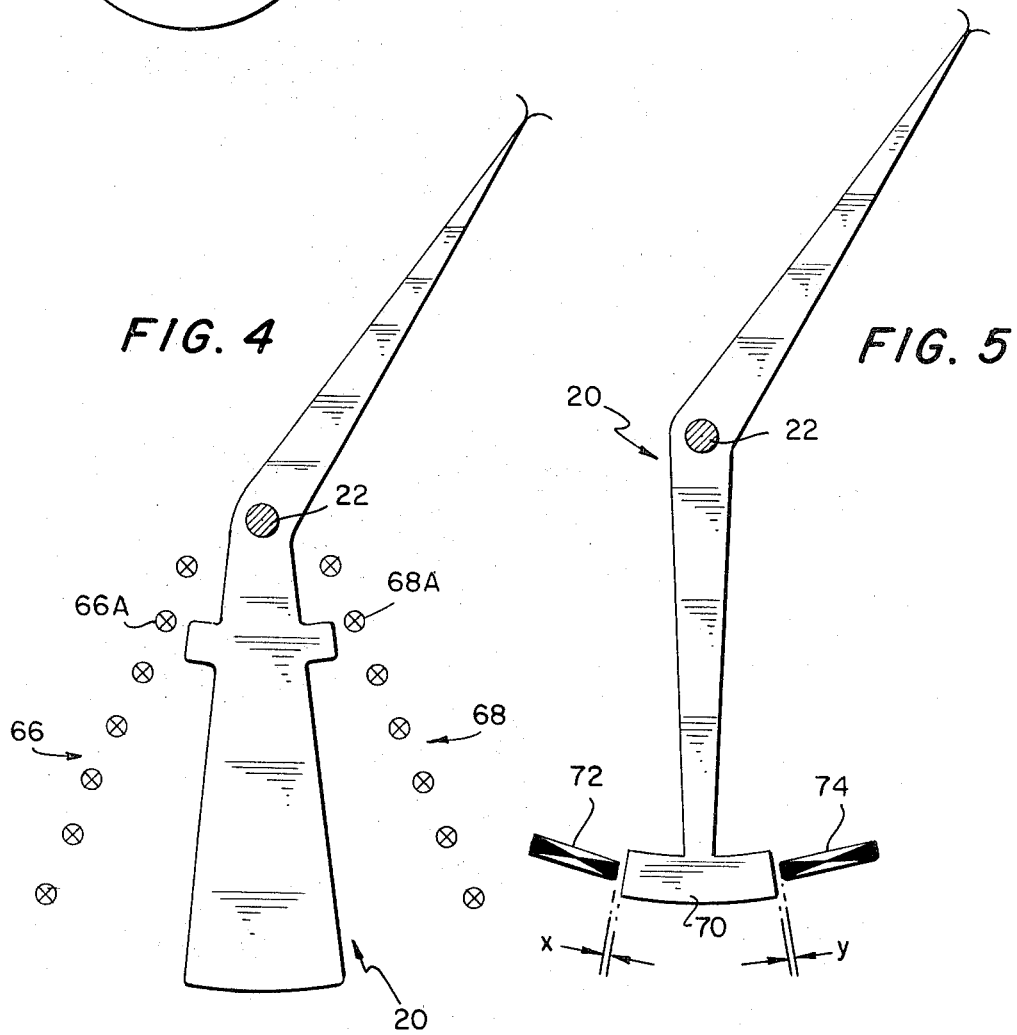
FIG. 4
FIG. 5

FILAMENT TENSION DETECTOR

BACKGROUND OF THE INVENTION

The present invention relates generally to tension detectors and, more particularly, it relates to a device specifically adapted to continuously monitor the tension of a large number of filaments, within a confined space, in an accurate but economic manner.

In many industrial processes, filamentary materials are subjected to manufacturing steps while being pulled from a payout reel to a take-up reel. Or, it is necessary to transfer a filamentary material from one type of reel to another for a subsequent manufacturing step. In most cases, it is necessary or desireable to maintain a substantially constant tension on the filament, so that the end product is of uniform quality and filament breakage is avoided.

Many devices exist for monitorying and/or controlling tension of a single filament. While the present invention may be employed for a single filament, it is specifically adapted for use in situations wherein a large number of filaments are being processed simultaneously, and it is desired to not only detect and control changes in the tension of a single filament, but also to be able to quickly and easily locate a filament having improper tension. For example, in a situation wherein a large number of filaments are being wound onto a single reel, the overall tension or pull exerted by the filaments collectively could be measured by known devices, but tension on individual filaments could not. Conversely, where a large number of filaments are being pulled from a single reel onto a plurality of individual take-up reels, use of a conventional tension-measuring device on each of the latter reels would be prohibitively expensive.

More specifically, in the process known as warp knitting, the thread may be supplied on 30 inches creels containing as many as 1,100 threads, and each thread must be wound onto an individual spindle prior to the actual knitting process. The machine which does this is called as warping machine. The tension with which the threads are wound onto the spindle affects the quality of the knitted fabric, because non-uniformly tensioned threads will tend to overlap inside the knitting machine. Of course, a broken thread will ruin a fabric. No device heretofore known has been capable of measuring tension of individual filaments on such a scale, at least on an economically practical basis.

The present invention will be described hereinbelow with reference to its application to the warp knitting process, but it will be appreciated that it is not so limited.

OBJECTS OF THE INVENTION

It is a general object of the present invention to provide an improved filament tension detector.

A further object of the present invention is to provide a filament tension detector adapted for simultaneous use with a large number of filaments.

Another object of the present invention is to provide an improved filament continuity detector.

Yet another object of the present invention is to provide a filament tension and/or continuity detector wherein improperly tensioned and/or broken filaments may be quickly and easily located.

A still further object of the invention is to provide a filament tension detector which may be installed on existing filament-treating machinery without affecting normal operation thereof but which, with associated control means, can be employed to maintain filament tension within predetermined limits.

Various other object and advantages of the invention will become clear from the following description of embodiments thereof, and the novel features will be particularly pointed out in connection with the appended claims.

THE DRAWINGS

Reference will hereinafter be made to the accompanying drawings, wherein:

FIG. 1 is a simplified schematic elevation showing location of a tension detector of the invention on a warping machine;

FIG. 4 is an elevation of an alternative pivot arm embodiment for use with a pair of light beam arrays; and FIG. 5 is an elevation of a further pivot arm embodiment for use in a uniformly illuminated field of view to produce an analog signal.

SUMMARY AND DESCRIPTION OF EMBODIMENTS

Figure 2:
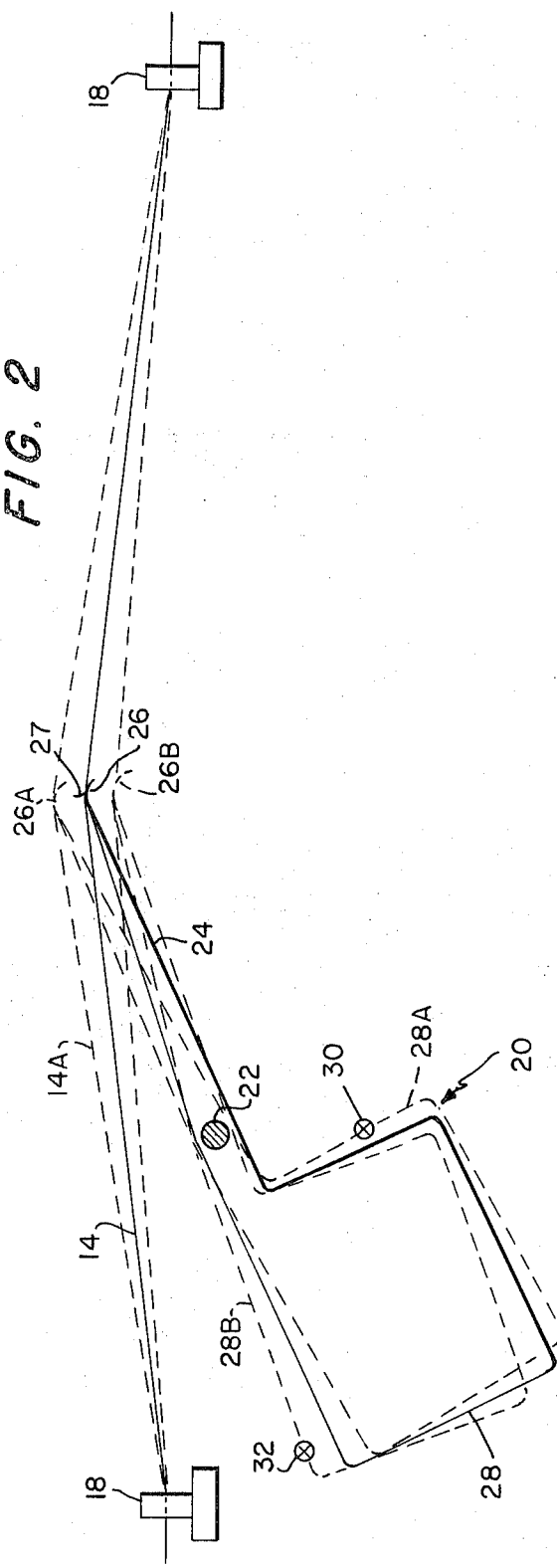
FIG. 2 is an elevation of a pivot arm assembly of an embodiment of the invention.

In essence, the present invention is based on the use of a centrally pivoted arm having a sufficient unbalanced mass to slightly deflect the filament passing over one end thereof. Changes in the tension of the filament cause a flag at the other end of the arm to rise or fall. Light beams or other sensing means are located at the limit positions, i.e. the flag positions where tensional tolerances are exceeded, so that a beam is broken if either the plus or minus tolerance limit is reached. Breaking of the light beam is used to activate the desired control function. In embodiments of the invention adapted to monitor a large number of filaments, as many pivot arms as desired are mounted on a single shaft, and a pair of light beams activates the control function if any one flag breaks the beam.

For ease of location of an offending filament, it is desireable to employ modular detectors containing a limited number of pivot arms. Thus, for example, a machine handling 1,000 filaments may be equipped with 20 detector modules each monitoring 50 filaments. When a given thread exceeds a tensional tolerance a beam in its module is broken, the machine is shut down and an indicator lamp on that module is energized. The operator immediately knows which module is involved and need only look for the flag breaking the beam in that module to find the offending filament.

It is possible to employ sensors other than light beams. For example, the flag limit positions may be defined by electrical conductors, and contact between a flag and the conductor utilized to close an electrical circuit and energize a desired control function. However, the use of optoelectronic sensing is preferred, at least in embodiments where filaments are closely spaced and/or tension forces are small, because the requirement of a large number of very closely spaced but freely and accurately rotable pivot arms on a single shaft presents certain engineering difficulties, discussed hereinbelow, which would be complicated by the additional requirement of reliable electric connection between each arm and the shaft.

It will be appreciated that any tension detector of the invention will inherently act as a continuity detector as well, since a broken filament will cause a flag to drop to a rest position, also breaking the low-tension light beam. It will be further appreciated that if the invention is to be employed solely as a continuity detector, then only one sensing beam is required.

For most applications of the invention, a simple on-off control function is adequate, i.e. the machine is shut down, tension on the offending filament is quickly and easily corrected, and the machine is restarted. In certain applications, however, it is desireable to have automatic correction of the intolerance. This is accomplished with two arrays of light beams, and flags having individually positioned tabs. Thus, the tab on flag A would break only beam A, activating control equipment on take-up reel A until the situation was corrected. Such automatic correction is practical only on equipment handling a limited number of filaments, and is obviously completely impractical for a warping machine of the type described.

Referring now to the embodiments shown in the drawings, FIG. 1 shows the location of the detector of the invention 10 on a warping machine, wherein a creel 12 containing several hundred threads 14 (one shown) is wound up on individual spindles or bobbins 16. A pair of guides or sley points 18 provide the necessary horizontal separation of the individual threads, which may be as little as 0.030 inch. Within the enclosure of detector 10 (shown in phantom) are the pivot arms 20 which form the essence of the invention, one of which is shown in detail in FIG. 2.

With reference to the latter figure, the pivot arm 20 is pivotally mounted for free rotation around shaft 22, and has one leg 24 with a thread rider on follower 26, and at the opposed end carries flag 28. It will be appreciated that other pivot arm geometries are possible, and FIG. 2 is to be considered exemplary. Depending on the intended application, most particularly the tension in the filament 14, the pivot arm 20 may be a simple metal stamping, die cast metal or a fabricated part. For application in a warping machine, where typical specifications are a tension of 7 grams and the tolerance is ± 2 grams, obviously a very light arm 20 is called for. The essential design parameter for arm 20 is that flag 28 have sufficiently greater mass than the rest of the arm to deflect filament 14 a few degrees (5° to 10° is generally sufficient) under normal tension, within the space defined by guides 18.

Whatever shape or type of pivot arm 20 is employed, it is generally necessary that the rider 26 have a wear-resistant surface. This may be a simple plating or vapor-deposition of a hard metal, boron-nitriding or the like. Also, rider 26 should have a pair of legs 27 in a general U-shape to horizontally restrain the filament 14 passing therebetween.

High and low tension limit positions are shown in phantom in FIG. 2. Thus, if tension in thread 14 lessens, the mass of arm 20 pushes it upward to 14A, rider 26A follows, and flag 28A drops, breaking the low-tension light beam 30. The position of beam 30 is such that if thread 14 should break and arm 20 swing to its rest position, beam 30 is broken thereby. When the tension on thread 14 increases, it pushes the rider down to the position 26B, raises the flag to 28B, and intercepts the high-tension light beam 32.

It is preferred that the rider 26 contact thread 14 midway between sley points or guides 18, as this simplifies calculation of the necessary unbalanced mass of flag 20. A horizontal line drawn between guides 18 will form an angle $\theta$ with thread 14, generally 5° to 10°. The total force F exerted by the thread on rider 26 will then be $2F_x$, where $F_x$ is the vertical component of the thread tension between one guide 18 and rider 26. If the desired tension in the thread is $F_z$, then $F_x = \sin \theta\, F_z$ With F known, it is a simple matter to design an arm 20 of the proper characteristics. If the contact point between rider 26 and thread 14 is not mid-way between guides 18, then $F \neq 2F_x$ and two separate calculations are required.

If it is desired to have a detector that can be assembled for varying degrees of tension, the mounting hole in arm 20 accomodating shaft 22 is formed as an elongated slot with a scalloped or serrated upper surface (or equivalent structure) so that the pivot point, and hence the unbalanced mass, may be varied.

Figure 3:
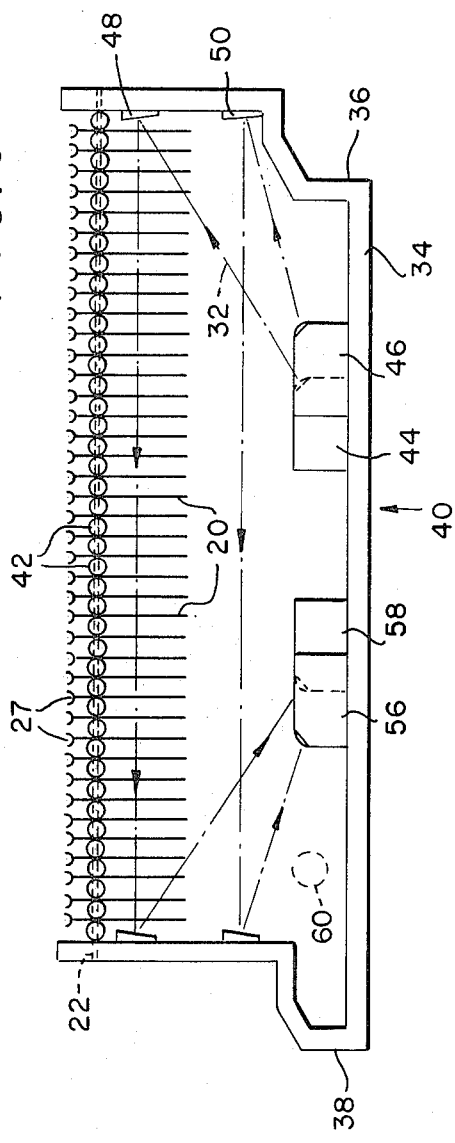
FIG. 3 is a cross-sectional elevation of a modular unit employing an embodiment of the invention.

A modular embodiment of the invention employing the pivot arms 20 is shown in FIG. 3. An enclosure 34 is provided with a female connector 36 at one end and a male connector 38 at the other end, so that a plurality of modules 40 may be plugged into each other. Shaft 22 is journaled into the walls of enclosure 34, and supports forty pivot arms 20, which are separated with spacers 42. These are preferably Teflon (TM) or a similar low-friction material. The high tension beam 32 originates at light source 44, and low tension beam 30 originates at source 46, both mounted on a wall of enclosure 34. By means of reflecting surfaces or mirrors 48, 50, the beams are directed along the paths indicated in FIG. 2. A second pair of mirrors 52, 54 reflect the unbroken beams to light sensors 56, 58.

In one mode of operation, the breaking of either beam in any module generates a signal from a sensor 56, 58 which shuts down the machine (not shown) and lights an indicator lamp 60 on the outside of enclosure 34 on the specific module where the tolerance was exceeded. It is thus a simple matter for the operator to find the module and the thread and correct the situation.

A pivot arm that will generate a signal to increase or decrease tension on a particular filament is shown in FIG. 4. The arm 20 in this instance has a pair of tabs 62, 64 on opposed portions of the flap portion. When the high tension tolerance is reached, tab 62 intercepts beam 66A in an array of high tension beams 66. The low tension tolerance is signalled by tab 64 intercepting beam 68A in array 68. Upon interception of beams 66A or 68A, the equipment controlling the filament on this particular pivot arm is signalled to either decrease or increase tension until the broken beam is restored, which signals the end of the needed corrective action. Other flags in the unit have tabs positioned to intercept other beams in the respective arrays, so that each filament is subject to individual control.

In copending U.S. application Ser. No. 350,077 filed Apr. 11, 1973 and assigned to the same assignee as the instant application, there is disclosed a linear position sensing device, wherein a pair of fresnel lens segments define an elongated viewing area between a light source and a light sensor, with a mask over the source lens providing uniform illumination over the entire field of view. Intrusion of an object into the field of view produces an analog signal, which can perform a control function such as to increase or decrease motor speed, etc. A pivot arm tension indicator of the type illustrated in FIG. 5 may be employed with this type of system. In this embodiment, the flag portion 70 of the pivot arm is shaped so as, upon pivoting, to progressively cover more or less of the two elongated viewing areas 72, 74 which are the uniformly illuminated areas described in said copending application. In this embodiment, the plus and minus tolerances are defined by the distances $x$ and $y$, which are the limits of pivotal movement the arm can make without the light sensors (not shown) initiating corrective action. It will be appreciated that this embodiment of the invention is adapted only for single filament tension control from a single pivot shaft.

The control circuitry associated with the light sensor is conventional in all respects and need not be described herein. Those skilled in the art will readily determine circuitry appropriate for a particular application. The sensors themselves may be photo-transistors, photodarlingtons or photomultipliers. For simple circuitry and a simple on-off function, the use of photosensitive silicon-controlled rectifiers (SCR's) is preferred.

Various changes in the details, steps, materials, and arrangements of parts, which have been herein described and illustrated in order to explain the nature of the invention, may be made by those skilled in the art within the principle and scope of the invention as defined in the appended claims.

What is claimed is:

1. Filamentary tension detection apparatus comprising:
   a pivot arm shaft;
   a pivot arm centrally mounted for pivotal rotation around said shaft; said pivot arm having a filament rider at one end and a flag at the opposed end, the mass of said flag end exceeding the mass of said rider end by an amount sufficient to upwardly deflect a filament contacting the upper edge of said rider a number of degrees under conditions of normal tension;
   a decrease in filament tension thereby increasing said deflection and an increase in filament tension thereby decreasing said deflection, with corresponding rotation of said pivot arm around said shaft; and
   sensing means adapted to generate a control signal upon movement of said flag beyond predetermined limits.

2. The apparatus as claimed in claim 1, wherein a plurality of said arms are mounted on said shaft.

3. The apparatus as claimed in claim 2, wherein said sensing means comprises
   a first light source providing a beam to a first light sensor, said beam positioned to be broken by a flag when tension on a corresponding filament exceeds a predetermined limit;
   a second light source providing a beam to a second light sensor, said beam positioned to be broken by a flag when tension on a corresponding filament falls below a predetermined limit.

4. The apparatus as claimed in claim 1, wherein deflection of a filament under normal tension is between 5° and 10°.

5. Filamentary tension detection apparatus comprises;
   an enclosure;
   means for guiding an array of parallel filaments through said enclosure in a single plane;
   a pivot arm shaft mounted within said enclosure transverse to and below the plane of said filaments;
   a plurality of pivot arms centrally mounted for pivotal rotation around said shaft, each said pivot arm having a filament rider at one end and a flag at the opposed end, the mass of said flag end exceeding the mass of said rider end by an amount sufficient to upwardly deflect a filament contacting the upper edge of said rider a number of degrees under conditions of normal tension;
   a decrease in filament tension thereby increasing said deflection and an increase in filament tension thereby decreasing said deflection, with corresponding rotation of said pivot arm around said shaft; and
   optoeloctronic sensing means adapted to generate a signal upon movement of any said flag beyond predetermined limits.

6. The apparatus as claimed in claim 5, wherein said optoelectronic sensing means comprises:
   a first light source providing a beam to a first light sensor, said beam positioned to be broken by a flag when tension on a corresponding filament exceeds a predetermined limit;
   a second light source providing a beam to a second light sensor, said beam positioned to be broken by a flag when tension on a corresponding filament falls below a predetermined limit.

7. The apparatus as claimed in claim 2, and additionally comprising uniquely positioned tabs on each of said flags, said sensing means comprising an array of light sources and light sensors providing light beams positioned to be broken by said tabs upon movement thereof beyond predetermined limits.

8. The apparatus as claimed in claim 1, wherein said sensing means comprises a pair of fresnel lens segments and a light source providing an elongated, uniformly illuminated field of view positioned so as to be blockable by said flag upon movement thereof away from a normal tension position, and a light sensor producing a signal proportional to the field of view blocked by said flag.

9. The apparatus as claimed in claim 1, wherein said pivot arm is adjustably mounted on said shaft, whereby the pivot point of said arm and corresponding deflection of said filament may be varied.

10. The apparatus as claimed in claim 5, wherein deflection of a filament under normal tension is between 5° and 10°.

11. The apparatus as claimed in claim 9, wherein said adjustable mounting comprises an elongated slot with means on the upper surface for retaining said shaft in a plurality of positions.

12. The apparatus as claimed in claim 1, wherein said rider is of a general U-shape.

13. The apparatus as claimed in claim 5, wherein said rider is of a general U-shape.

* * * * *